United States Patent [19]
Watson et al.

[11] Patent Number: 5,237,771
[45] Date of Patent: * Aug. 24, 1993

[54] FISHING LURE

[75] Inventors: Teddie G. Watson, Henderson, Nev.; Jeffrey L. Orth, Salt Lake City, Utah

[73] Assignee: Soundtech, Inc., LaJolla, Calif.

[*] Notice: The portion of the term of this patent subsequent to Oct. 2, 2007 has been disclaimed.

[21] Appl. No.: 837,662

[22] Filed: Feb. 14, 1992

Related U.S. Application Data

[63] Continuation of Ser. No. 715,730, Jun. 17, 1991, abandoned, which is a continuation of Ser. No. 587,251, Sep. 24, 1990, abandoned, which is a continuation of Ser. No. 354,917, May 22, 1989, Pat. No. 4,960,437.

[51] Int. Cl.$^5$ .............................................. A01K 85/00
[52] U.S. Cl. ................................... 43/42.31; 43/17.1
[58] Field of Search ............................ 43/17.1, 42.31

[56] References Cited

U.S. PATENT DOCUMENTS

| | | | |
|---|---|---|---|
| 2,577,229 | 12/1951 | Carnes | 43/42.31 |
| 2,757,475 | 8/1956 | Pankove | 43/17.1 |
| 2,784,399 | 3/1957 | Smith | 43/17.1 |
| 2,920,318 | 1/1960 | Balcken | 43/17.1 |
| 2,932,110 | 4/1960 | Kilpunen | 43/42.31 |
| 3,068,604 | 12/1962 | Nuberg | 43/42.31 |
| 3,120,073 | 2/1964 | Brunton | 43/17.1 |
| 3,310,902 | 3/1967 | Godby | 43/17.1 |
| 3,416,254 | 12/1968 | Bornzan | 43/17.1 |
| 4,380,132 | 4/1983 | Atkinson | 43/42.31 |
| 4,583,313 | 4/1986 | Dugan | 43/17.1 |
| 4,625,447 | 12/1986 | Buchanan | 43/17.1 |
| 4,805,339 | 2/1989 | Fuentes | 43/42.31 |
| 4,932,007 | 6/1990 | Suomala | 43/17.1 |
| 4,951,410 | 8/1990 | Ly | 43/17.1 |
| 4,960,437 | 10/1990 | Watson | 43/17.1 |
| 5,001,856 | 3/1991 | Gentry | 43/42.31 |
| 5,038,513 | 8/1991 | Hardon | 43/42.31 |
| 5,046,278 | 9/1991 | Szilagyi | 43/17.1 |

*Primary Examiner*—Kurt C. Rowan
*Attorney, Agent, or Firm*—Trask, Britt & Rossa

[57] ABSTRACT

A fishing lure has a battery powered oscillator circuit positioned within a water resistant container to power a coil and in turn a noise making plunger. The noise making plunger may also have an arm or a boot attached in order to generate motion within the water to act as a fish-luring motion. The water-resistant container is affixed to the shaft of a hooking structure or positioned in the vicinity of another lure or bait.

19 Claims, 2 Drawing Sheets

FISHING LURE

This application is a continuation, of application Ser. No. 07/715,730, filed Jun. 17, 1991, now abandoned.

This application is a continuation, of application Ser. No. 587,251, filed Sep. 24, 1990, now abandoned.

This is a continuation, of application Ser. No. 354,917, filed May 22, 1989 now U.S. Pat. No. 4,960,437.

BACKGROUND OF THE INVENTION

1. Field

This invention relates to fishing lures. In particular this invention relates to fishing lures which have means to generate fish-luring action.

2. State of the Art

A wide variety of fishing lures include means to fish-luring action in the form of noise or vibration. For example, U.S. Pat. No. 4,223,467 (Hodges, Jr. et al.) discloses a fishing lure which intermittently buzzes and vibrates upon a change in attitude. The fish lure has an ovate body with hooks suspended therefrom. Such a lure may be referred to as a plug.

U.S. Pat. No. 4,380,132 (Atkinson) is a plug with a water tight cavity within which a spring is positioned to oscillate to generate mechanical sounds or a transducer to supply or transmit sound energy into the water.

U.S. Pat. No. 3,841,012 (Maled) shows an electrically powered cylindrical or ovate plug with a rotating eccentric to generate a wobbling type motion. Similarly U.S. Pat. No. 3,310,902 is also an ovate or cylindrical fishing lure or plug with electrical components therein to generate a buzzing sound.

U.S. Pat. No. 4,805,339 (Funtes et al.) shows a cylindrical or ovate plug with an electronically powered transducer fluid coupled to the water to transmit acoustic signals into the water in selected patterns.

U.S. Pat. No. 4,583,313 (Dugan, Jr.) also shows a cylindrical or ovate type fishing lure with circuitry to generate signals in a predetermined frequency band.

The lures in the above noted references contain the electrical or mechanical components within their bodies to which the fish are attracted. Hooks or hooking structure are attached to the bodies of such lures.

It is presently understood that typical game fish have a type of inner ear to hear or sense sound transmitted through the water. In addition, it is understood that fish have lateral line sensing organs to sense sound. It is presently understood that lateral line perception is in the lower frequencies somewhere between about 4 hertz and 200 hertz. Inner ear sound sensing by fish is believed to be at frequencies approximately between 2 hertz and 1000 hertz.

It is presently understood that the lateral line sensing is used by fish to establish the relative origin of the sound by direction and depth and possibly even range. Other sounds may be representative of a minnow and or other aquatic creature which could be viewed by the fish as food. *The In Fisherman*, Book #85, April '89, page 42-53.

As noted hereinbefore, there are a number of fishing lures specifically intended to radiate acoustic energy into the environment of a fish. The devices heretofore mentioned all appear to be of substantial size and are plugs. None of the disclosed devices have been sized to be small enough to attach to, for example, a jig, or to be suspended or attached to a plug lure if such be desired. Similarly devices for combination or securement in front of or immediately proximate to a desired plug, a spinner assembly or bait have heretofore not been presented.

It is also presently understood that some fish see and in turn respond to flashing light or movement. Whole classes of lures such as spoons, spinners and the like are available which presumably attract fish by the flashing. It is assumed that the flashing is intended to imitate the flash from a minnow or other aquatic creature to simulate food for the targeted fish. However, movement of the water in a manner to emulate the minnow is not presently understood to be effected by existing lure except to the extent it may be effected by movement of the lure through the water by, for example, trolling or by operation of the fishing rod and reel by the fisherman. In either case the lure is moving past potential locations of fish which the fisherman wants to catch.

There is a need for a separate operational device sized small enough to be associated with a game fish fishing lure, bait, spinner or jig structure so that it may be readily added or subtracted to the overall fishing arrangement and at the same time be configured to be stationary or moveable, at the option of the fisherman, to generate desired acoustical signals and even mechanical vibration signals to enhance the fish-luring action. Further, there is a need for such devices which radiate acoustic signals preselected in a pattern to be suggestive of food to fish as well as to provide signals for lateral line sensing by the fish.

SUMMARY OF THE INVENTION

A fishing lure includes hook means for fishing in water. The hook means includes hooking structure and a shaft extending therefore a preselected distance. The fishing lure includes operation means secured to the shaft by connecting means. The operation means includes a water resistant container with an oscillator circuit positioned therewithin to generate and supply preselected patterned electrical signals. Battery means are positioned within the water resistant container and are connected to supply electrical power to the oscillator circuit. Luring means are mechanically associated with the water resistant container and connected to the oscillator circuit to receive the preselected patterned electrical signals to generate fish-luring action in accordance therewith. In one arrangement, the hook means is a jig hook for fresh water fish. In addition, the connecting means is an eye formed at the end of the shaft opposite the hooking structure.

In a preferred arrangement, the battery means is at least one wrist-watch type battery. The water resistant container preferably has a first aperture to receive at least one wrist-watch type battery. Closure means are provided to close the aperture after insertion of the battery.

In a more desirable arrangement, the hooking structure has a diameter and the water resistant container is a cylinder sized and cross-sectioned to be less than the diameter of the hooking structure. It is also sized in length to be less than the preselected distance of the shaft. Preferably the hooking structure is an arcuate extension of the shaft having a diameter from about 1" to about ¼". The shaft is preferably from about 1" to about 2" in length. The water resistant cylinder may have a first end with an aperture formed therein. The closure means may be a plug insertable into the aperture.

In a desired arrangement, the luring means includes a coil with a movable plunger positioned to contact the water resistant container proximate the coil. The coil is connected to receive the preselected patterned electrical signals to move the plunger toward and away from the coil and against the water resistant container to make noise as the fish-luring action. Preferably the preselected patterned electric signals cause operation of the plunger at a preselected frequency, and desirably in pulses at preselected pulse repetition rate.

In an alternate arrangement, the fishing lure of the instant invention may further include a coil with the movable plunger sized to contact the water resistant container. A spring is interconnected between the plunger and the water resistant container to urge the plunger toward the water resistant container. The coil is connected to receive the preselected patterned electrical signal to move the plunger away from the water resistant container and release the plunger for movement by the spring against the water resistant container to make noise as the fish-luring action. Preferably the preselected patterned electrical signals cause the coil to activate the plunger at a preselected frequency and most preferably in pulses at a preselected pulse repetition rate.

In one configuration, the water resistant container has a second aperture formed therein. An extension is attached to the plunger to sealably and movably extend through the aperture for movement with the plunger to impart motion to the water as the fish-luring action.

The preselected patterned electrical signals include a base signal at a preselected frequency transmitted in pulses at a preselected pulse repetition rate to cause the motion to be imparted at the frequency of the preselected pulse repetition rate. Desirably the fishing lure includes a rubber-like boot positioned over the second end and connected to the extension for movement thereby. In an alternate arrangement, a paddle extends from the extension through the second aperture, for movement by the extension. A rubber-like boot is sealably positioned about the paddle and the second aperture.

An alternate fishing lure has an operation device secured to the lure. The operation device includes a water resistant container with an oscillator circuit, battery means and luring means to generate fish-luring action.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
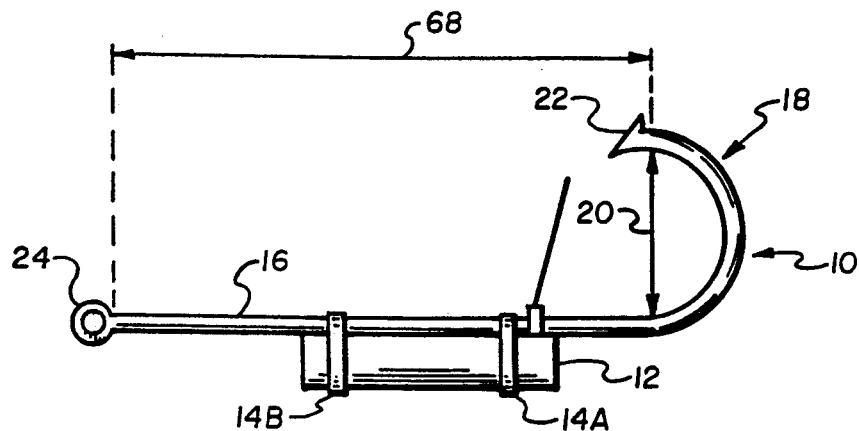
FIG. 1 is a side view of a fishing lure of the instant invention.

A fishing lure of the instant invention includes hook means for fishing in water with operation means secured thereto by securing means. As shown in FIG. 1, the hook means is a hook 10 of the type which may be used for fishing for game fish such as bass, walleye, and the like. Other sizes and shapes of hooks may be equally suitable. The operation means shown in FIG. 1 is an operation device 12 secured to the hook means by connecting means which are straps 14A and 14B. As noted hereinafter, the operation means generates fish-luring action.

The fishing lure arrangement of the invention may also include a plug or a combination of plugs with spinners. It may also be operation means placed in front of a hook with bait such as a worm or minnow. Indeed, the fishing lure may be virtually any structure secured to the end of a fishing line the purpose or objective of which is to act as a bait or a lure for fish.

The hook 10 shown in FIG. 1 has a shaft 16 extending away from hooking structure 18. In FIG. 1, the hooking structure 18 can be seen to be an arcuate extension of the shaft 16 having a diameter 20 with a barb 22 at the end thereof. At the end of the shaft 16 remote from the hooking structure 18 is connection means shown as an eye 24 formed for connection to the fishing line, a leader or similar structure.

As noted hereinbefore, the operation means is secured to the shaft 16 of the hook means by connecting means which is here shown to be two straps 14A and 14B which are snugly wrapped about the operation device 12 and the shaft 16. Other means of securing the operation device 12 to the shaft or hook 10 or other hooking means may be equally as suitable. For example, rubber bands or elastics, gluing, heat shrinkable tubing and clamping may also be suitable. As better seen in FIG. 3, the operation device 12 has recesses 71A-D formed in its external surface to accommodate the straps or strings 14A and 14B. The straps 14A and 14B may be any convenient material desired by the user. As presently contemplated, the straps 14A and 14B will be some form of nylon or plastic material which is not water absorbent. Notably the lure of FIG. 1 may be used as a jig.

Figure 2:
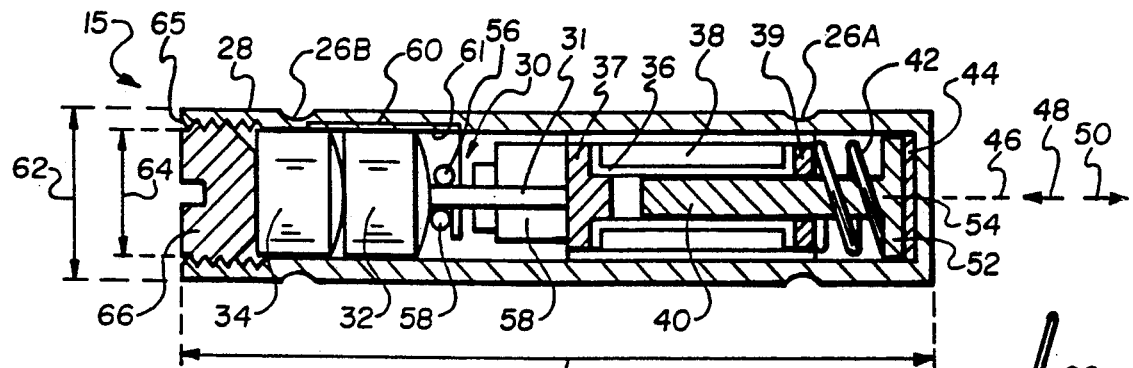
FIG. 2 is a cross-sectional view of an operation device of the instant invention.

FIG. 2 is a cross-section of an operation device 15 substantially enlarged for purposes of illustration and discussion. The operation device 15 includes a water-resistant container 28 with an oscillator circuit 30 positioned therewithin. The oscillator circuit may be any one of the types illustrated schematically in FIGS. 5, 6 and 7 as hereinafter discussed. The oscillator circuit 30 is positioned within the water resistant container 28 and includes a circuit board 31 with components 56 and 58 interconnected to generate and supply preselected patterned electrical signals.

Battery means are also positioned within the water resistant container 28 and conductively connected to supply electrical power to the oscillator circuit 30. As illustrated in FIG. 2, the battery means is comprised of 2 wrist-watch type batteries 32 and 34 as more fully discussed hereinafter. The luring means of the operation device 15 is mechanically associated with the water-resistant container 28 and connected to the oscillator circuit 30 to receive the preselected patterned electrical signals to in turn generate fish-luring action in accordance with the patterned electrical signals.

In FIG. 2, the battery means are shown contacting circuit board 31 to supply power to the oscillator circuit 30 and in turn to the luring means. The illustrated luring means has a solenoid which includes a coil 38 and a coil core or plunger 40 positioned for movement by and within the coil 38. The coil 38 is positioned in a plastic spool 36. The efficiency of the coil 38 is enhanced by end plates 37 and 39. The coil 38 is a conventional coil consisting of windings which generate a magnetic flux upon activation with electrical energy. The plunger 40 is made of a material susceptible of movement by the magnetic flux generated by the coil 38.

In FIG. 2, a spring 42 is positioned between the plunger 40 and the coil 38 to urge the plunger 40 toward 50 the strike plate 44 in the water-resistant housing 28 along the center axis 46 of the coil 38. The strike plate 44 may be any material which generates a desired sound or vibration when struck by plunger 40. In this embodiment the strike plate is metal.

In operation, the coil 38 creates a magnetic field which draws the plunger 40 axially away 48 from the strike plate 44. Upon deactivation of the coil 38 by the oscillator circuit 30, the plunger 40 is urged along axis 46 toward 50 strike plate 44. Mechanical contact between the plunger 40 and strike plate 44 creates a mechanical noise with an energy or decibel level related to the speed at which the plunger 40 strikes the plate 44.

As may be seen in FIG. 2, a clapper 52 is positioned at the distal end 54 of the plunger 40. The clapper 52 is sized to slidably fit within the water-resistant container 28. Thus, the clapper 52 acts not only as a member to contact the strike plate 44 to create the noise as discussed hereinbefore, but also as an alignment bushing in order to maintain the alignment of the plunger 40 as it moves axially 46 inwardly 48 and outwardly 50.

The spring means 43 as here illustrated is a coil spring selected to have a spring constant or resiliency so that the coil 38 may cause the plunger 40 to move inwardly 48 and overcome the outward 50 force of the spring 42. It may understood that other types of springs may be used including leaf springs, and even a foam rubber material selected with a resiliency upon compression which would urge the plunger 40 outwardly 50 toward the strike plate 44 of the water resistant container 28.

The coil 38 is here shown in cross-section without depicting the windings thereof to avoid confusion. The coil 38 is a commercially available coil which those skilled in the art may be able to readily obtain from a number of commercial sources. In a successful prototype the coil arrangement was included within a standard vibrator part no. 12RT04CC.

Figure 5:
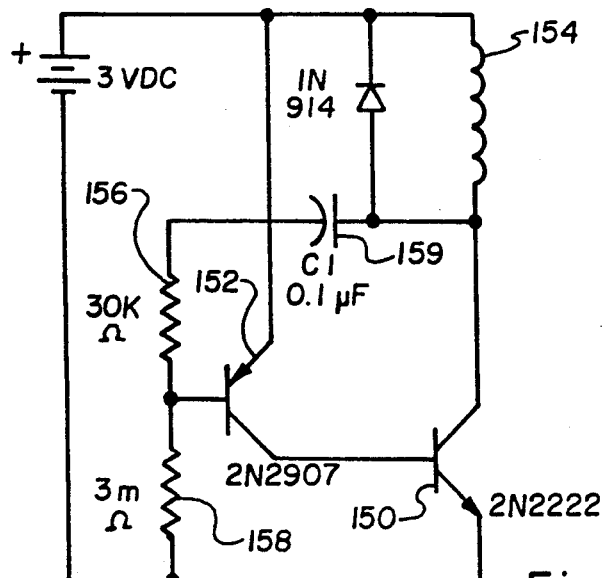
FIG. 5 is a circuit diagram for an oscillator circuit for use in an operational structure of the instant invention.
Figure 6:
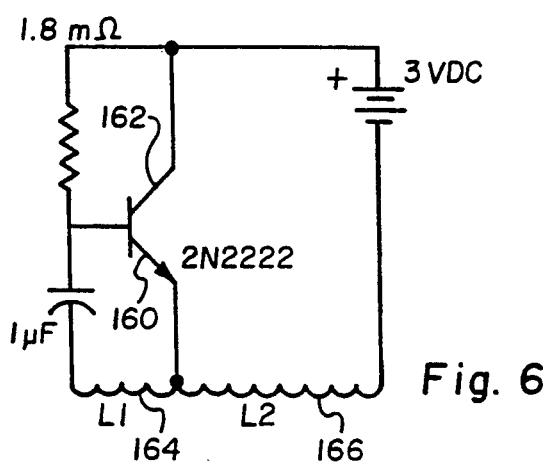
FIG. 6 is a circuit diagram of an alternate oscillator for use in the operational structure.
Figure 7:
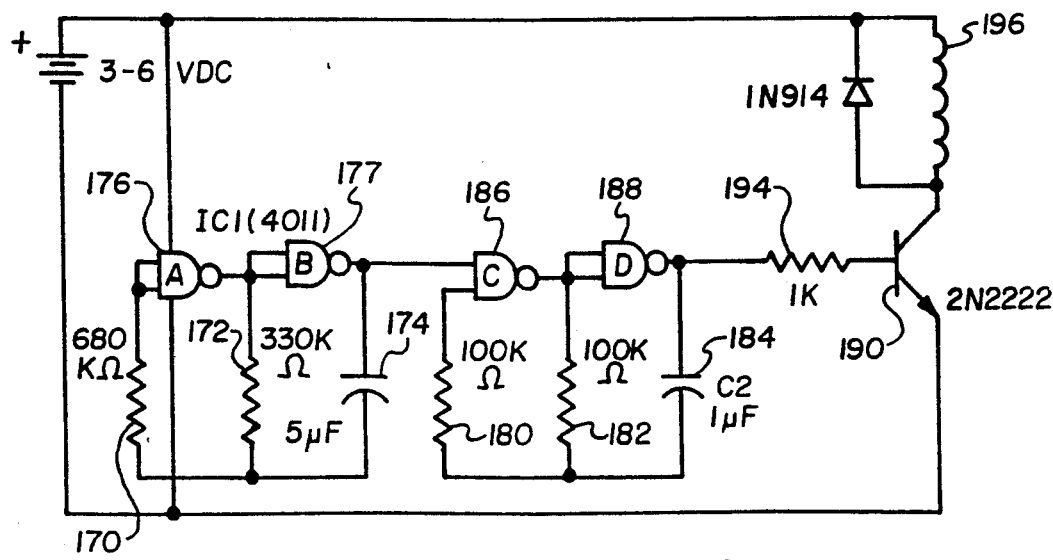
FIG. 7 is a circuit diagram of an alternate oscillator circuit for use in the operational structure of the instant invention.

As discussed, the oscillator circuit 30 may be any one of the oscillator circuits schematically illustrated in FIGS. 5, 6 or 7. The circuit is connected to the batteries 32 and 34 by a positive conductor 60 illustrated within the wall 61 of the water-resistant container 28. However it should be understood that the water-resistant container 28 may itself be metallic and act as a conductor.

As noted, the operation means includes battery means which are batteries 32 and 34. In particular, cylindrical mercuric oxide batteries are now widely available and suitable for use in small objects such as in watches, hearing aids, pocket calculators and the like. Mercuric oxide batteries are preferred because they have a notably large current density of about 100 milliamperehours. These small batteries are conveniently herein termed wrist-watch type batteries. Presently two batteries are used to provide increased power and extended life. The diameter 62 of the water-resistant container 28 is selected to accommodate the wrist-watch type batteries 32 and 34. That is, the inside diameter 64 is selected so that the batteries 32 and 34 may be slidably and snugly positioned within the water-resistant container 28. After positioning of the batteries 32 and 34 through the aperture 65 as illustrated in FIG. 2, a plug 66 is here shown threaded into the aperture 65 of the water-resistant container 28 to snugly urge the batteries 32 and 34 to make conductive connection to circuit board 36. Virtually any form of sealing arrangement can be used to seal the aperture 65 as long as it urges the batteries and retains them within the water-resistant structure and effects a water-resistant field. The plug 66 illustrated is slightly over-sized so that upon threaded placement within the water-resistant container 28, a water-resistant seal is effected. Other structures such as that shown in FIG. 4 as well as a rubber boot or even a cork arrangement with conical interior surface in the aperture 65 could be used so that with increasing depth of water the sealing is enhanced.

The water-resistant container 28 may be made of any desired material. As illustrated, it is preferably a plastic material which is not susceptible to corrosion while being impervious to water. The water resistant container 28 is shown to be cylindrical in shape with two blunt ends. It should be appreciated that the container 28 and its ends may be formed in a variety of shapes for image or appearance and for hydrodynamic reasons.

As noted hereinbefore, the diameter 62 of the operation means (FIG. 2) is selected to be less than the diameter of the hooking structure 18 (FIG. 1). Similarly the length 66 of the operation means in FIG. 2 is selected to be less than the length 68 of the shaft 16. In particular, it can be seen that the operation means in FIG. 1 is miniaturized to easily adapt to hook 10 selected to catch game fish such as bass, croppie, walleye, trout and the like. Thus the diameter 20 of the hooking structure 18 will be selected to be from about 1" to about ¼" with the length 68 of the shaft 16 being selected to be from about 2" to about 1". The combination of the operation means 12 with the hook 10 in FIG. 1 forms what may be viewed as a jig lure.

Figure 3:
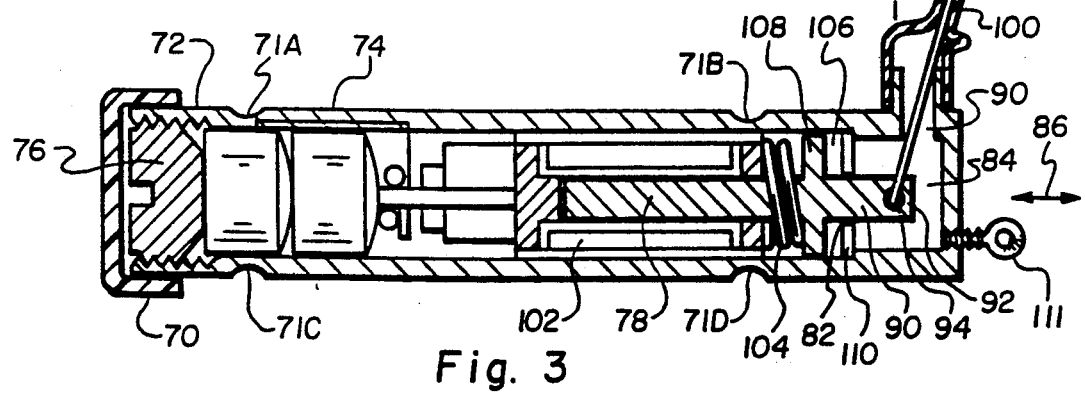
FIG. 3 is a cross-sectional view of an alternate embodiment of an operation device of the instant invention.

In other fishing configurations, it may be noted that the operation device 12 shown in FIG. 1 may be attached by screw eyes or by straps to a plug or suspended or interconnected in the fishing line in front of a bait or behind a bait depending upon the particular fishing arrangement selected by the user. FIG. 3 shows a screw eye 11 suitable for attaching to other structures.

Referring now to FIG. 3, the operation means illustrated in cross-section is substantially similar to the operation means of FIG. 2. In FIG. 3, a rubber like boot 70 is placed over one end 72 the water-resistant container 74. The rubber boot 70 may be used with a spring or clip to hold the batteries in place in lieu of the plug 76 or with the plug 76 to improve the sealing and water-resistant character of the operation means.

In FIG. 3, the plunger 78 has an extension 80 extending therefrom through an aperture 82 formed to snugly and slidably receive the plunger 80. The plunger 80 extends into a chamber 84 and moves back and forth or reciprocates 86 therein upon movement of the plunger 78. An arm 88 extends outwardly through an opening 90. The arm 88 is connected to the distal end 92 of the plunger 80. As here shown, the arm 88 is connected by simply inserting it through an opening 94 formed in the distal end 80 of the extension 90. The opening 94 is sized to allow the arm 88 to move 96 through an arc 98. A rubber boot 100 is positioned around the opening 90 and the arm 88 to effect a water-resistant seal.

In FIG. 3, the plunger 78 is shown withdrawn by solenoid 102 with the spring 104 compressed to create a gap 106 through which the clapper 108 moves to contact the strike plate 110 in order to create a noise simultaneously with the movement of the arm 88 to effect water agitation as fish-luring action. Of course, the strike plate 110 may be a sound absorbent material so that the water agitation is effected without noise. Also, an eye similar to eye 111 may be attached to one or both ends to facilitate attachment to a fishing line near bait or to other lure structure.

Figure 4:
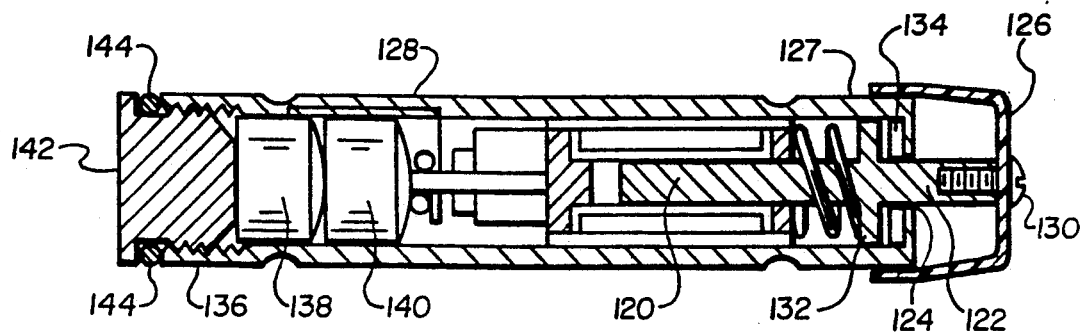
FIG. 4 is a cross-sectional view of an alternate embodiment of operational structure of the instant invention.

In FIG. 4, the operation means shown in cross-section is substantially identical to that shown in FIG. 2. In FIG. 4, the plunger 120 has an extension 122 extending through an aperture 124. The aperture and the extension 122 are sized so that the extension may snugly yet slidably move through the aperture 124. A rubber boot 126 is sealingly positioned about the end 127 of the water-resistant container 128 to effect a water-resistant seal. The boot 126 may be secured to the extension 122 by a screw 130. Upon movement of the plunger 120 and in turn the extension 122, the boot 126 flexes in and out to create water turbulence in the vicinity of the boot 126 as fish-luring action. At the same time, the clapper 132 contacts the strike plate 134 to generate a noise. The clapper 132 may be eliminated or smaller than the inside dimension of the container 128 because alignment of the plunger 122 can be maintained by the aperture 124 which aperture also simultaneously acts as a bushing. At the other end 136, the batteries 138 and 140 are held in place by a plug-cap 142 with a gasket 144 to effect a water-resistant seal.

Referring now to FIG. 5, an oscillator circuit is shown using a complimentary pair of bipolar transistors 150 and 152. The coil 154 is energized to produce movement of the plunger such as plunger 40 at a frequency determined by the combination of the resistors 156, 158 and capacitor 159. The ratio of the values of the resistors 156 and 158 determines the length of time that the coil 154 is energized and in turn the amount of power consumed in operation. It can be seen that the two resistors here 156 and 158 are valued at 30 kilohms and 3 megohms. This relationship results in an output signal supplied to the coil 154 a frequency of about 4 hertz. It can be seen that by adjusting the ratio of the resistors 156 and 158, the frequency can be selected to vary from about 4 hertz to about 1000 hertz.

FIG. 6 depicts an alternate oscillator circuit which is a simplified Hartly oscillator. The coil such as coil 38 is composed of two inductors 164 and 166 to actually form part of the overall oscillating circuitry. The emitter 160 of the transistor 162 is connected to the coil structure so that the windings of coil 164 are about ½ the number of turns of the coil 166.

A two stage oscillator circuit is shown in FIG. 7. The first oscillator is composed of resistor 170, resistor 172, capacitor 174 and two dual input "nand" gates 176 and 177. The nand gate is ¼ of a standard quad nand gate integrated circuit. Complimentary metal oxide semiconductor (CMOS) circuitry is preferred due to low power consumption and wide supply voltage range. The first oscillator in effect is used to select the pulse repetition rate in that it controls the frequency and length of time that the second oscillator is enabled to produce higher frequency pulses. The second oscillator as here shown includes resistors 180, 182 and capacitor 184 along with input nand gates 186 and 188. The second oscillator generates a pulse train drive through a bias resistor 194 to drive the coil 196 which is the coil of the solenoid.

It can be seen that any one of the circuits shown on FIG. 5, 6 or 7 maybe formed on a miniaturized IC printed circuit board such as circuit 36 in FIG. 2. The oscillator circuit can be preselected to provide signals at a frequency in pulses at a preselected pulse repetition rate. The pulse repetition rate is preferably selected to be between 4 hertz and 200 hertz to be sensed by the lateral sensing of the fish. The frequency of the signals generated by the action of the clapper such as clapper 52 striking plate 44 is selected to be detected by the inner ear sensing of the fish.

As earlier noted, the operation means when appended to the hooking means to form a lure which is a jig structure. It may further be noted that operation means may be constructed to be buoyant so that the entire structure operates shallow and even on the surface.

It should be also noted that the arm 88 or the boot 126 are operated to generate motion within the water into which the operation means is placed. High speed motion may be effected to generate water noise roughly at the same frequencies and at the same pulse repetition rates as hereinbefore discussed. Also rapid operation in the water medium creates a kind of frothing or cavitation which may also visually be detected by a fish.

It is to be understood that the embodiments of the invention herein described are merely illustrative of the application of the principals of the invention. Reference herein to details of the illustrative embodiment is not intended to limit the scope of the claims which themselves recite those features regarded as essential to the invention.

We claim:

1. A fishing lure comprising;
   hook means for fishing in water, said hook means including
      hooking structure and a shaft extending therefrom a preselected distance;
   operation means secured to said shaft, said operation means including
      a water-resistant container,
      securing means for securing said water-resistant container to said shaft,
      an oscillator circuit positioned within said water resistant container to generate and supply preselected patterned electrical signals,
      battery means positioned within said water resistant container and conductively connected to supply electrical power to said oscillator circuit, and
      luring means mechanically associated with said water-resistant container and connected to said oscillator circuit to receive said preselected patterned electrical signals therefrom for generating fish luring action in accordance therewith; and
   connecting means for connecting said hook means to structure for operation by a remote operator.

2. The fishing lure of claim 1 wherein said hook means is a jig hook for fresh water fish and wherein said connecting means is an eye formed in said shaft at the end of said shaft opposite said hooking structure.

3. The fishing lure of claim 1 wherein said battery means is at least one wrist-watch type battery, and wherein said water resistant container has a first aperture to receive therewithin at least one said wristwatch type battery and closure means to close said aperture.

4. The fishing lure of claim 3 wherein the said hooking structure has a diameter and wherein the said water-resistant container is a cylinder sized in cross section to be less than said diameter of said hooking structure and in length less than the said preselected distance of said shaft.

5. The fishing lure of claim 4 wherein said hooking structure is an arcuate extension of said shaft, said arcuate extension having a diameter from about one inch to about one fourth of one inch, and wherein said shaft in from about one inch to about two inches in length.

6. The fishing lure of claim 3 wherein said water-resistant container is a cylindrical with a first end, wherein said first aperture is formed in said first end and wherein said closure means is a plug insertable into said aperture.

7. The fishing lure of claim 3 wherein said luring means includes a coil with a moveable plunger positioned to contact said water-resistant container and proximate said coil which is connected to receive said preselected patterned electrical signals to move said plunger toward and away from said coil and against said water-resistant container to make noise as said fish-luring action.

8. The fishing lure of claim 7 wherein said preselected patterned electrical signals are signals transmitted at a preselected frequency.

9. The fishing lure of claim 3 wherein said luring means further includes;
- a coil with a moveable plunger positioned proximate said coil and sized to contact the said water-resistant container, and
- spring interconnected between said plunger and said water-resistant container to urge said plunger toward said water-resistant container,
- said coil being connected to receive said preselected patterned electrical signals to move said plunger away from said water-resistant container and release said plunger for movement by said spring against said water-resistant container to make noise as said fish-luring action.

10. The fishing lure of claim 9 wherein said preselected patterned electrical signals cause said coil to activate and said plunger to move at a preselected frequency in pulses at a preselected pulse repetition rate.

11. The fishing lure of claim 3 further including a second aperture formed through said water-resistant container and an extension attached to said plunger to snugly and movably extend through said aperture for movement upon movement of said plunger for imparting motion to said water as said fish-luring action.

12. The fishing lure of claim 11 wherein said preselected patterned electrical signals are coil activating signals transmitted at a preselected frequency at a preselected pulse repetition rate to cause said motion to be imparted at said preselected frequency at said preselected pulse repetition rate.

13. The fishing lure of claim 12 wherein said water-resistant container is cylindrical with a first end opposite a second end, wherein said first aperture is formed in said first end, wherein said second aperture is formed in said second end, and wherein said fishing lure includes a rubber-like boot positioned over said second end, said boot being secured to said extension for movement thereby.

14. The fishing lure of claim 12 wherein said water-resistant container is cylindrical with a first end opposite a second end, wherein said second aperture is formed proximate said second end, wherein said fishing lure further includes a paddle extending through said second aperture and connected to said extension for movement by said plunger and wherein said fishing lure further includes a rubber-like boot sealably positioned about said paddle and said second aperture.

15. The fishing lure of claim 3 wherein said water resistant container has a second aperture, wherein said luring means includes a coil with a moveable plunger interactively positioned for movement by said coil, said plunger having an extension to sealably and movably extend through said aperture for movement upon movement of said plunger to impart motion to said water as said fish-luring action.

16. For use with a fishing lure, an operation device secured to said lure, said operation device including;
- a water-resistant container,
- securing means for securing said water-resistant container to said lure,
- an oscillator circuit positioned within said water-resistant container to generate and supply at a preselected frequency and in pulses at a preselected pulse repetition rate,
- battery means positioned within said water-resistant container and conductively connected to supply power to said oscillator circuit, and
- luring means mechanically associated with said water resistant container and including
  - a coil with a moveable core sized and positioned to contract said water resilient container,
  - a spring interconnected between said core and said water-resistant container to urge said core toward said water-resistant container,
  - wherein said coil is connected to receive said electrical signals to cause said core to move toward and away from said water-resistant container at said preselected frequency in pulses at said preselected pulse repetition rate.

17. The operation device of claim 16 wherein said water-resistant container has an aperture and wherein said core has an extension positioned through said aperture wherein said operation device includes boot means positioned to seal said aperture.

18. The operation device of claim 17 wherein said preselected frequency is from about 4 hertz to about 200 hertz.

19. The operation device of claim 16 wherein said preselected frequency is from about two hertz to about 1000 hertz and wherein said pulse repetition rate is from about four hertz to about 200 hertz.

* * * * *